Patented May 6, 1952

2,595,304

UNITED STATES PATENT OFFICE 2,595,304

TRIHALOMETHYL DERIVATIVES OF 1,3-DIOXANE

Elmer F. Schroeder, Chicago, Ill., assignor to G. D. Searle & Co., Chicago, Ill., a corporation of Illinois No Drawing. Application September 27, 1950, Serial No. 187,128

3 Claims. (Cl. 260—338)

This invention relates to 1,3,5-trioxepane and 1,3-dioxane derivatives having in the 2-position a trihalomethyl group and to processes for preparing the same. In particular it relates to compounds having the general structural formula

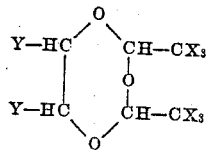

and

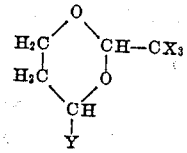

wherein X is a halogen and Y is hydrogen or lower alkyl.

This application is a continuation-in-part of my copending application Serial No. 4,930, filed January 28, 1948, now Patent No. 2,532,340, dated December 5, 1950.

In the foregoing structural formula, X represents a halogen such as gromine or chlorine. Y represents hydrogen or lower alkyl radicals such a methyl, ethyl, propyl and butyl.

The compounds of my invention are produced by reacting an $\alpha,\beta$- or $\alpha,\gamma$-glycol with chloral or bromal or their hydrates in the presence of concentrated sulfuric acid at low temperature, generally in the range of 0° C. to 20° C. over a period of ½ to 5 hours. The reaction mixture is then diluted, preferably with ice to maintain a low temperature, and the resulting trioxepane or dioxane precipitates, generally as an oil. This is further purified by removal of lower-boiling impurities and generally can be obtained in crystalline form.

The substances to which this invention relates are generally useful as hypnotics and sedatives. They have the property of depressing the central nervous system and are therefore useful in pharmaceutical preparations. Certain of the compounds are effective both by parenteral and oral routes and others are active, orally. Many of them are of value as disinfectants.

My invention is further disclosed by the following examples which are provided for the purpose of illustration and which are not intended in any way to limit this invention in spirit or in scope. Quantities of materials are given in parts by weight.

Example 1

A. To a mixture of 182 parts of choral hydrate and 553 parts of concentrated sulfuric acid are added during 40 minutes 76 parts of propylene glycol, the temperature being maintained at 10–15° C. After the addition, the reaction mixture is stirred for 2 hours at 0–10° C., then warmed to 25° C. and stirred for an additional 3-hour period. The mass is poured onto 1000 parts of cracked ice. The lower dark oily layer is separated from the aqueous layer. The oil is dissolved in about 500 parts of methylene chloride and washed with water, with dilute bicarbonate solution, and again with water. It is dried with anhydrous sodium sulfate, treated with decolorizing charcoal, and filtered. The methylene chloride is removed under reduced pressure and the residue is distilled. A liquid fraction boiling at 90–92° C. at 17 millimeters pressure is obtained. On redistillation, this material boils at 89–92° C. at 16 mm. pressure, and is nearly colorless. This material is shown by analysis to be 2-trichloromethyl-4-methyl-1,3-dioxolane.

B. The residue remaining after the distillation of 2-trichloromethyl-4-methyl-1,3-dioxolane becomes partly solid on standing. This is dissolved in 95% alcohol and chilled. Crystals of 2,4-bis-trichloromethyl-6-methyl-1,3,5-trioxepane separate. On further recrystallization from 95% alcohol, the crystals melt at 104–105° C.

Example 2

A. To a mixture of 182 parts of chloral hydrate and 553 parts of concentrated sulfuric acid cooled to 2° C. are added 90 parts of meso-2,3-butanediol ($n^{25}_D=1.4362$; $[\alpha]^{28}_D=+0.99°$) during a period of 1 hour, the temperature being kept at 10–12° C. The mixture is stirred at 0–10° C. for 4 hours, then brought to room temperature and stirred for 2 hours. The reaction mixture is poured onto 1000 parts of cracked ice. Upon standing, an oily layer containing a small amount of crystals settles out. The aqueous layer is decanted and the partly crystalline oil is washed with water. The crystals are removed from the oil by decantation and washed with petroleum ether. Upon recrystallization from methyl ethyl ketone these crystals melt at 176–178° C. Analysis indicates that this material is 2,4-bis-trichloromethyl-6,7-dimethyl-1,3,5-trioxepane.

B. The oily fraction is dissolved in about 400 parts of methylene chloride, washed with water, dilute bicarbonate solution, and again with water, The solution is dried with sodium sulfate, filtered, and evaporated under reduced pressure. The residue of 2-trichloromethyl-4,5-dimethyl-1,3-dioxolane is distilled under reduced pressure, and boils at 95–97° C. at 14 mm. pressure.

Example 3

182 parts of chloral hydrate are mixed with 553 parts of concentrated sulfuric acid until liquefied. To the chilled mixture are added 104 parts of 1,2-pentanediol over a period of 2 hours, the temperature being maintained at 6–10° C. The reaction mixture is stirred for 3 hours at ice temperature, and 1½ hours at room temperature, then poured onto about 1000 parts of ice. The oily layer which precipitates is separated from the water layer, taken up in methylene chloride, washed with water and bicarbonate solution, dried, and filtered. After the evaporation of the solvent the residue is distilled under reduced pressure and boils at 102–125° C. at 13 mm. pressure. On redistillation, a fraction boiling at 104–106° C. at 11 mm. is obtained. This material is 2-trichloromethyl-4-n-propyl-1,3-dioxolane.

Example 4

90 parts of 1,3-butanediol, 182 parts of chloral hydrate, and 553 parts of concentrated sulfuric acid are reacted at low temperature as in Example 3. The reaction mixture is worked up by the method of Example 3. The oily residue of 2-trichloromethyl-4-methyl-1,3-dioxane distills at 120–125° C. at 26 mm. pressure. On redistillation, 2-trichloromethyl-4-methyl-1,3-dioxane boils at 119–121° C. at 25 mm. pressure.

Example 5

26 parts of trimethylene glycol, 182 parts of chloral hydrate, and 553 parts of concentrated sulfuric acid are reacted as in Example 3. The oily residue is obtained by the usual procedure (see Example 3). On standing, this oily residue crystallizes. It is dissolved in 4 volumes of warm 75% ethanol, treated with decolorizing charcoal, and filtered. The filtrate is chilled, and plate-like crystals of 2-trichloromethyl-1,3-dioxane separate. These melt at 72–74° C.

I claim:

1. A trihalomethyl-substituted 1,3-dioxane derivative having the formula

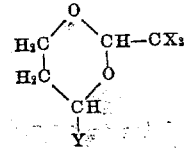

wherein X is halogen and Y is selected from hydrogen and lower alkyl radicals.

2. 2-trichloromethyl-4-methyl-1,3-dioxane.
3. 2-trichloromethyl-1,3-dioxane.

ELMER F. SCHROEDER.

REFERENCES CITED

The following references are of record in the file of this patent:

UNITED STATES PATENTS

| Number | Name | Date |
|---|---|---|
| 2,241,777 | Friedrichsen | May 13, 1941 |
| 2,245,260 | Dickey | June 10, 1941 |
| 2,525,681 | Jones | Oct. 10, 1950 |